US012681990B1

(12) United States Patent
Zhang et al.

(10) Patent No.: US 12,681,990 B1
(45) Date of Patent: Jul. 14, 2026

(54) SYSTEMS FOR DETERMINING REPRESENTATIONS OF ENTITIES BASED ON GRAPH DATA USING A LANGUAGE MODEL

(71) Applicant: AMAZON TECHNOLOGIES, INC., Seattle, WA (US)

(72) Inventors: Houyu Zhang, Redmond, WA (US); Seongjun Yun, Vancouver (CA); Alejandro Ricardo Mottini D'oliveira, Seattle, WA (US); Qingjun Cui, Sunnyvale, CA (US); Theodoros Vasiloudis, Seattle, WA (US); Xiang Song, Los Altos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/978,419

(22) Filed: Dec. 12, 2024

(51) Int. Cl.
*G06F 16/901* (2019.01)
*G06F 16/334* (2025.01)
*G06F 16/35* (2025.01)

(52) U.S. Cl.
CPC ...... *G06F 16/9024* (2019.01); *G06F 16/3344* (2019.01); *G06F 16/35* (2019.01)

(58) Field of Classification Search
CPC .. G06F 16/9024; G06F 16/3344; G06F 16/35; G06F 40/30; G06F 40/40; G06F 40/279;

G06F 40/284; G06N 3/045; G06N 5/022; G06N 3/042; G06N 3/0455; G06N 3/0475; G06N 5/04; G06V 10/82

See application file for complete search history.

(56) References Cited

U.S. PATENT DOCUMENTS

| | | | |
|---|---|---|---|
| 11,238,065 B1 * | 2/2022 | Tang | G06F 16/282 |
| 12,373,425 B1 * | 7/2025 | Rai | G06F 16/248 |
| 2022/0230625 A1 * | 7/2022 | Zhu | G10L 15/063 |
| 2022/0245481 A1 * | 8/2022 | Russell | G06N 5/04 |
| 2023/0178076 A1 * | 6/2023 | Abramson | G06N 3/084 |
| | | | 704/232 |
| 2024/0046330 A1 * | 2/2024 | Fan | G06Q 30/0631 |
| 2024/0177210 A1 * | 5/2024 | Zhang | G06Q 30/0629 |
| 2025/0156653 A1 * | 5/2025 | Yuan | G06F 16/3347 |
| 2025/0209484 A1 * | 6/2025 | Kasmi | G06N 3/088 |

* cited by examiner

*Primary Examiner* — Dennis Truong
(74) *Attorney, Agent, or Firm* — Lindauer Law, PLLC

(57) ABSTRACT

A large language model (LLM) may be used to generate an overall entity representation of an entity using an input that includes individual representations based on graph data, text data, and image data associated with the entity. Graph data that represents characteristics of the entity and types of relationships between the entity and other entities is used to generate a graph representation. Text associated with the entity is used to generate a text representation. Image data associated with the entity is used to generate an image representation. These representations are used to generate an input to the LLM, which is trained to generate an entity representation based on the input. The entity representation may be used by other models, such as to determine entities having similar or differing characteristics.

20 Claims, 5 Drawing Sheets

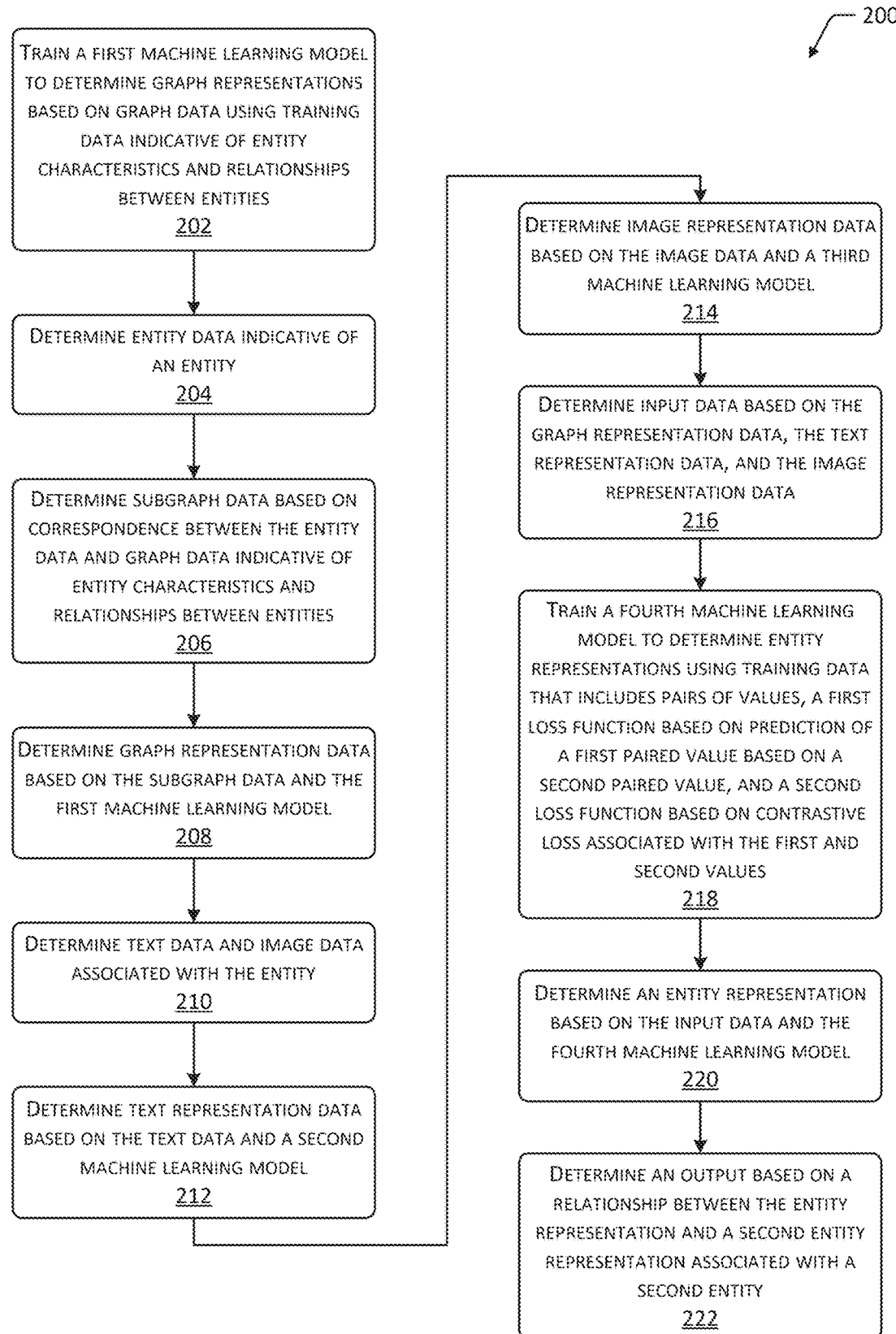

200

TRAIN A FIRST MACHINE LEARNING MODEL
TO DETERMINE GRAPH REPRESENTATIONS
BASED ON GRAPH DATA USING TRAINING
DATA INDICATIVE OF ENTITY
CHARACTERISTICS AND RELATIONSHIPS
BETWEEN ENTITIES
202

DETERMINE ENTITY DATA INDICATIVE OF
AN ENTITY
204

DETERMINE SUBGRAPH DATA BASED ON
CORRESPONDENCE BETWEEN THE ENTITY
DATA AND GRAPH DATA INDICATIVE OF
ENTITY CHARACTERISTICS AND
RELATIONSHIPS BETWEEN ENTITIES
206

DETERMINE GRAPH REPRESENTATION DATA
BASED ON THE SUBGRAPH DATA AND THE
FIRST MACHINE LEARNING MODEL
208

DETERMINE TEXT DATA AND IMAGE DATA
ASSOCIATED WITH THE ENTITY
210

DETERMINE TEXT REPRESENTATION DATA
BASED ON THE TEXT DATA AND A SECOND
MACHINE LEARNING MODEL
212

DETERMINE IMAGE REPRESENTATION DATA
BASED ON THE IMAGE DATA AND A THIRD
MACHINE LEARNING MODEL
214

DETERMINE INPUT DATA BASED ON THE
GRAPH REPRESENTATION DATA, THE TEXT
REPRESENTATION DATA, AND THE IMAGE
REPRESENTATION DATA
216

TRAIN A FOURTH MACHINE LEARNING
MODEL TO DETERMINE ENTITY
REPRESENTATIONS USING TRAINING DATA
THAT INCLUDES PAIRS OF VALUES, A FIRST
LOSS FUNCTION BASED ON PREDICTION OF
A FIRST PAIRED VALUE BASED ON A
SECOND PAIRED VALUE, AND A SECOND
LOSS FUNCTION BASED ON CONTRASTIVE
LOSS ASSOCIATED WITH THE FIRST AND
SECOND VALUES
218

DETERMINE AN ENTITY REPRESENTATION
BASED ON THE INPUT DATA AND THE
FOURTH MACHINE LEARNING MODEL
220

DETERMINE AN OUTPUT BASED ON A
RELATIONSHIP BETWEEN THE ENTITY
REPRESENTATION AND A SECOND ENTITY
REPRESENTATION ASSOCIATED WITH A
SECOND ENTITY
222

ENTITY DATA 110

ENTITY IDENTIFIER 112

TEXT DATA 106

IMAGE DATA 108

DETERMINE ENTITY DATA THAT INCLUDES TEXT DATA AND IMAGE DATA ASSOCIATED WITH AN ENTITY
302

GRAPH DATA 104

SUBGRAPH MODULE 116

ENTITY DATA 110

THRESHOLD DATA 120

DETERMINE SUBGRAPH DATA BASED ON THE ENTITY DATA, GRAPH DATA INDICATIVE OF ENTITY CHARACTERISTICS AND RELATIONSHIPS BETWEEN ENTITIES, AND A THRESHOLD DISTANCE VALUE
304

SUBGRAPH DATA 118

DETERMINE GRAPH REPRESENTATION DATA BASED ON THE SUBGRAPH DATA AND A FIRST MACHINE LEARNING MODEL, TEXT REPRESENTATION DATA BASED ON THE TEXT DATA AND A SECOND MACHINE LEARNING MODEL, AND IMAGE REPRESENTATION DATA BASED ON THE IMAGE DATA AND A THIRD MACHINE LEARNING MODEL
306

| SUBGRAPH DATA 118 | TEXT DATA 106 | IMAGE DATA 108 |
|---|---|---|
| GRAPH ENCODER 122 | TEXT ENCODER 126 | IMAGE ENCODER 130 |
| GRAPH REPRESENTATION 124 | TEXT REPRESENTATION 128 | IMAGE REPRESENTATION 132 |

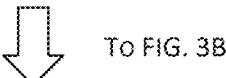

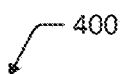

400

COMPUTING DEVICE(S) 402

POWER SUPPLY
404

COMMUNICATION
INTERFACE(S) 410

I/O INTERFACE(S)
412

NETWORK
INTERFACE(S) 414

I/O DEVICE(S) 416

PROCESSOR(S)
406

CLOCK(S)
408

MEMORY 418

OPERATING SYSTEM MODULE
420

COMMUNICATION MODULE
424

SUBGRAPH MODULE 116

GRAPH ENCODER 122

TEXT ENCODER 126

IMAGE ENCODER 130

INPUT MODULE 134

LARGE LANGUAGE MODEL (LLM) 140

OTHER MODULE(S)
426

DATA STORE 422

GRAPH DATA 104

ENTITY DATA 110

SUBGRAPH DATA 118

THRESHOLD DATA 120

GRAPH REPRESENTATION 124

TEXT REPRESENTATION 128

IMAGE REPRESENTATION 132

INPUT DATA 136

INPUT PARAMETERS 138

ENTITY REPRESENTATION(S) 102

OTHER DATA 428

FIG. 4

SYSTEMS FOR DETERMINING REPRESENTATIONS OF ENTITIES BASED ON GRAPH DATA USING A LANGUAGE MODEL

BACKGROUND

Machine learning models may be used to generate embeddings that are representative of an input.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a flow diagram depicting an implementation of a method for determining entity representations for an entity based on graph data, text data, and image data, and using entity representations to determine an output.

FIGS. 3A and 3B are a diagram depicting an implementation of a method for determining entity representations based on graph data, text data, image data, and one or more machine learning models.

FIG. 4 is a block diagram depicting a computing device within the present disclosure.

Figure 1:
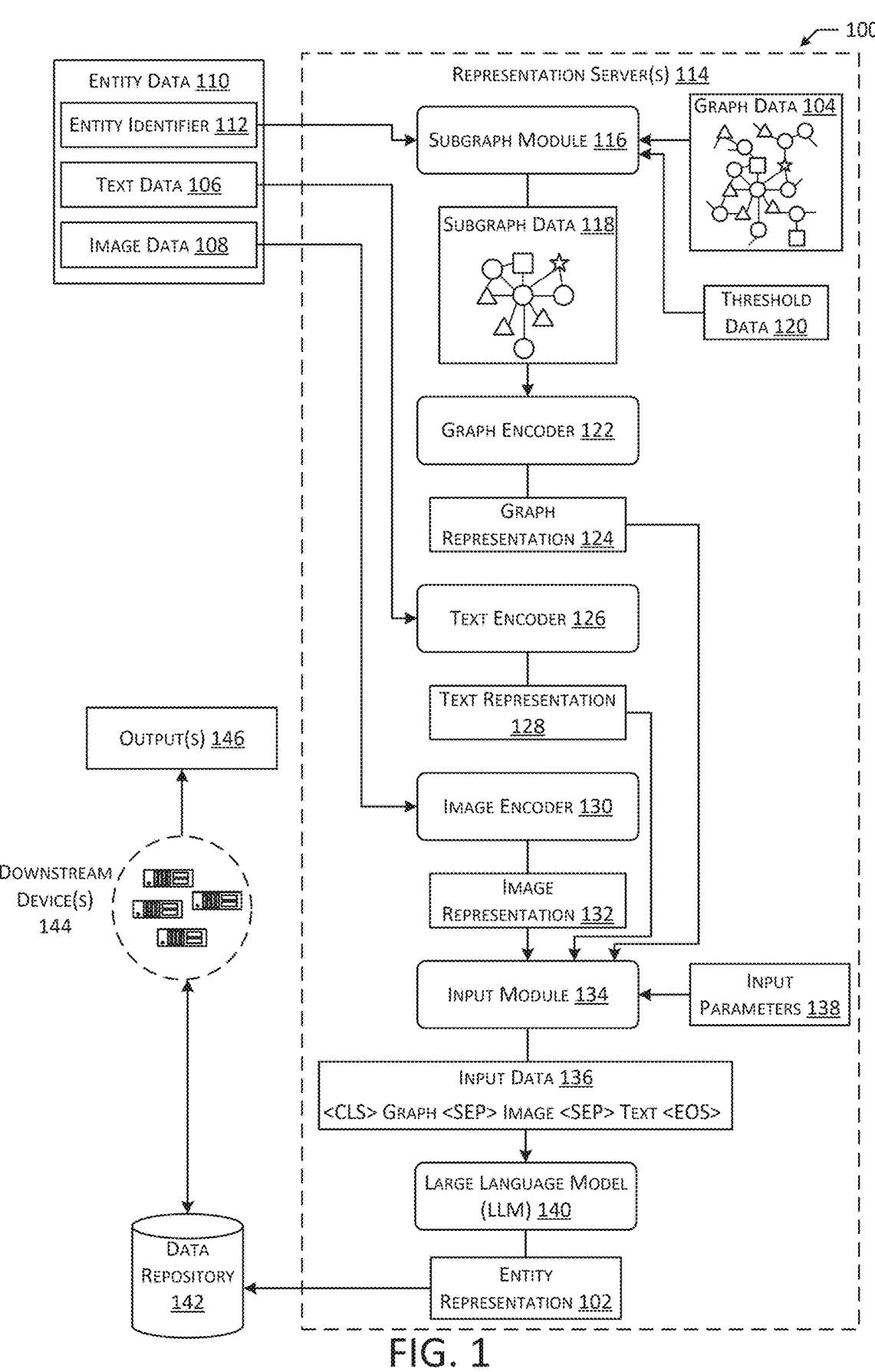
FIG. 1 is a diagram depicting an implementation of a system for determining entity representations indicative of characteristics of an entity based on graph data, text data, and image data associated with the entity.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

An online store may offer a variety of items (e.g., physical goods, services, digital goods) for purchase, lease, subscription, and so forth. For example, an online store may include a collection of interfaces that present information regarding items, receive user input such as search queries or selection of navigational links, provide controls for initiating transactions and providing user input for other purposes, and so forth. In some cases, an interface may present information that is relevant to a user, such as recommendations or other information regarding items that are similar or related to items that a user has purchased, viewed, or otherwise interacted with. In other cases, information regarding items may be used to perform other types of tasks, such as price predictions or search query recommendations. Determining relationships and similarities between items and determining accurate information regarding items may represent a computationally intensive task that may be subject to inaccuracy. In some cases, information regarding various entities (e.g., items, item categories, brands or manufacturers of items, regions or geolocations where one or more items may be available, and search queries that have been received) may be stored as a graph. For example, graph data may include multiple nodes and multiple edges. Each node of the graph may represent characteristics of an entity, while each edge is associated with two nodes and represents a type of relationship between the entities represented by the nodes. For example, a node representing an item may include data indicative of characteristics of the item, a node representing an item category may include data indicative of characteristics of the category, a node representing a brand may include data indicative of characteristics of the brand, a node representing a region or geolocation may include data indicative of characteristics of the region or geolocation, and so forth. An edge connecting two nodes that represent items may indicate co-occurring user interactions for those items, while an edge connecting a node that represents a search query with a node that represents an item may indicate that receipt of the search query ultimately led to the purchase of the item. As other examples, edges that connect a node representing a brand or item category with a node representing an item may indicate that the item is included in that brand or category.

One method for determining items and other types of entities that are similar or related may include the generation of machine-readable representation data that represents characteristics of the entity. For example, based on input data representing the characteristics of an item, one or more machine learning models may determine representation data that includes a machine-readable representation of the characteristics of the item. One example type of representation includes a vector embedding, which may have multiple dimensions, each dimension corresponding to one or more characteristics, and the value associated with each dimension indicating the particular characteristic(s) of the entity represented by the embedding. The distance between two vector embeddings within a common embedding space may be used to determine a degree of similarity between the two entities represented by the embeddings. For example, a small distance between two vector embeddings may indicate that the represented entities are similar (e.g., having a significant number of identical or similar characteristics). Techniques to determine representation data for entities that accurately represent the characteristics of the entities may be used for various purposes, such as recommendations of items, item brands, or item categories, recommendations of search queries, predictions or prices or other item characteristics, and so forth. However, many types of machine learning models that are usable to determine such representations are not typically able to utilize the data and relationships represented in graphs, which may result in the determination of suboptimal representations or representations that include incomplete information.

Described in this disclosure are techniques that utilize a machine learning model, which in some implementations may include a large language model (LLM), to determine an entity representation indicative of characteristics associated with entities, based at least in part on graph data that represents characteristics of entities and types of relationships between entities. For example, graph data may include multiple nodes, each node representing characteristics of a particular entity (e.g., an item, item category, item brand, or search query). The graph data may also include a plurality of edges, each edge associated with two nodes and representing a type of relationship between the entities represented by the nodes. For example, one type of relationship represented by an edge may include the co-occurrence of user interactions with the associated entities. Continuing the example, if a threshold number of users that interact with a first item during a session also interact with a second item during the session, this relationship may be represented by an edge. Other example types of relationships represented by edges may include edges that associate items of a particular category with the node representing the category, items associated with a particular brand with the node representing the brand, and search queries that resulted in the purchase of an item with the item that was purchased.

For a selected entity, a relevant portion of the graph data (e.g., subgraph data) may be determined. In some implementations, the subgraph data may include the set of nodes and edges that are a threshold distance from the node representing the selected entity. For example, all nodes that are connected to the node representing the selected entity by an edge may be included in the subgraph data if the threshold distance is one. All nodes that are connected to a node that is connected to the node representing the selected entity may be included in the subgraph data if the threshold distance is two. A graph encoder or other type of machine learning model may be trained to determine a graph representation based on the subgraph data. The graph representation may represent the characteristics of the entity that are associated with the node that represents the entity, as well as at least a portion of the types of relationships represented by the edges that are connected to the node that represents the entity, and at least a portion of the characteristics of the other nodes associated with those edges. In some implementations, the graph encoder may be trained to predict occurrence of a first type of relationship—co-occurring user interactions during a session, while one or more other types of relationships are represented in the graph representation.

In some cases, a selected entity may also be associated with text data and image data, in addition to the data included in the graph. A text encoder or other type of machine learning model may be used to determine a text representation based on the text and semantic information of the text data. An image encoder or other type of machine learning model may be used to determine an image representation based on characteristics of the image data. The graph representation, text representation, and image representation may be used to determine an input to a machine learning model, which in some implementations may include an LLM, such as through use of initial tokens, separator tokens, tokens indicating the end of an input, and so forth. In some implementations, one or more of the graph representation, text representation, or image representation may be modified, such as through use of a projection technique, to map the representation to a dimensionality that is usable with an LLM or other type of model. The LLM or other type of model may be trained to determine entity representations indicative of characteristics of an entity based on one or more of graph data, text data, or image data, using training data that includes multiple pairs of values, such as seed values and target values. For example, the machine learning model may be trained to predict subsequent seed tokens, subsequent target tokens, target tokens that correspond to seed tokens, and contrastive loss associated with seed and target tokens. Continuing the example, an LLM or other type of machine learning model may be trained using training data that includes pairs of values, a first loss function based on prediction of a first value of a pair based on a second value of the pair, and a second loss function based on contrastive loss associated with the first value and the second value of the pair.

One or more outputs from the machine learning model may be used to determine an entity representation that represents characteristics of the entity. In some implementations, multiple outputs of the model may be processed using an averaging operation or a pooling operation to determine a final entity representation. At a subsequent time, the entity representations for one or more entities may be used for additional operations, such as item recommendations, search query recommendations, price predictions, predictions of other entity characteristics, and so forth.

Techniques described herein may therefore enable a machine learning model, which in some cases may include an LLM, to determine entity representations that accurately represent the characteristics of entities, and that incorporate the robust information included in graph data that may not necessarily be present in text data and image data that is specific to the entity. For example, an entity representation determined based in part on graph data may represent the types and characteristics of the relationships of the represented entity with other entities, and in some cases may also represent one or more characteristics of the related entities.

FIG. 1 is a diagram 100 depicting an implementation of a system for determining entity representations 102 indicative of characteristics of an entity based on graph data 104, text data 106, and image data 108 associated with the entity. As described previously, one example implementation of the system of FIG. 1 may include use in conjunction with an online store from which one or more items (e.g., physical goods, digital goods, services) may be purchased, leased, subscribed, and so forth. As such, one example type of entity may include an item. For example, entity data 110 associated with an item may be indicative of characteristics of the item, such as an item name, category, type or sub-type, price, size, color, materials, dimensions, ratings or reviews, and so forth. In some implementations, the entity data 110 may include the text data 106, such as text descriptive of the item, and image data 108, such as one or more images associated with the item. Other example types of entities may include item categories, or item brands or manufacturers, and the entity data 110 associated with these entities may include text data 106, image data 108, or other types of data indicative of characteristics of the categories, brands, or manufacturers. Another example type of entity may include a search query. For example, characteristics of a search query may include the search terms, a time when the query was received, items that were included in an output responsive to the search query, user interactions such as purchases that occurred subsequent to presentation of the output, and so forth.

In some implementations, entity data 110 associated with an entity may include an entity identifier 112. An entity identifier 112 may include any type of data that may be used to distinguish a particular entity from one or more other entities, such as a name, alphanumeric string, or other type of data. In some cases, an entity identifier 112 may include data that is not necessarily understandable to a human user but may be used by one or more computing devices to differentiate an entity from one or more other entities. While FIG. 1 depicts text data 106 and image data 108 included as entity data 110, in some implementations, text data 106, image data 108, or other data associated with an entity may be stored or otherwise maintained separate from the entity identifier 112 or other entity data 110, and in response to receiving the entity data 110 or entity identifier 112, one or more computing devices may determine and access the text data 106 and image data 108 associated with the entity.

FIG. 1 depicts one or more representation servers 114 that may determine entity representations 102 based on one or more of graph data 104, text data 106, or image data 108. While FIG. 1 depicts a single diagram of a representation server 114, in other implementations, the representation server(s) 114 may include any number and any type of computing devices including, without limitation, one or more personal computing devices, portable computing devices, wearable computing devices, vehicle-based computing devices, servers, networked media devices, network-associated data storage devices, and so forth.

A subgraph module 116 associated with the representation server(s) 114 may determine subgraph data 118 based on the entity data 110 for an entity and the graph data 104. While FIG. 1 depicts the entity data 110 as a separate element from the representation server(s) 114 for illustrative purposes, in some implementations, the entity data 110 may be stored in association with the representation server(s) 114. In other implementations, the entity data 110 may be received from one or more other computing devices, such as through user input or an input from a service, machine learning model, or computing device. In still other implementations, input from a user or external device may be used to select or indicate an entity, and the representation server(s) 114 may determine and access the entity data 110 associated with the indicated entity.

The graph data 104 may represent characteristics of entities and relationships between entities. In some cases, one or more characteristics of an entity indicated in the graph data 104 may also be included in the text data 106, image data 108, or other entity data 110. For example, data that is associated with an entity represented in the graph data 104 may include text data, image data, or combinations thereof, that may be identical or similar to data included in the entity data 110. Continuing the example, a node representing an item may include text data, image data, or other data indicative of item characteristics, a node representing a brand may include text data, image data, or other data indicative of brand characteristics, a node representing an item category may include text data, image data, or other data indicative of category characteristics, a node representing a region may include text data, image data, or other data indicative of region characteristics, and so forth. In some cases, the graph data 104 may indicate characteristics of an entity that are not included in the entity data 110. For example, entity data 110 may not necessarily indicate relationships between the associated entity and other entities, or characteristics of other related entities, while the graph data 104 may include such information. Additionally, in some implementations, the graph data 104 may include types of data that are not included in the entity data 110. For example, the graph data 104 may include video data or other modalities of data that are not included in the entity data 110. As another example, the graph data 104 associated with an entity may include information regarding the entity, such as counts of user interactions, transactions associated with the entity, and so forth, which may not necessarily be included in the entity data 110. In some implementations, the graph data 104 may include multiple nodes, each node representing a particular entity. Characteristics of the represented entity may be stored in association with each node. Relationships between entities may be represented by edges, each edge being associated with two nodes and indicating a relationship between the entities represented by each of the two nodes. As described previously, one example type of relationship represented by an edge may include the co-occurrence of user interactions with the associated entities. For example, if at least a threshold number of users that interact with a first item also interact with a second item, this relationship may be represented by an edge. Other example types of relationships represented by edges may include an indication of an association between an item and the item category to which the item belongs, or an indication of an association between an item and the brand or manufacturer of that item. Another example type of association may include a relationship between a search query that resulted in the purchase of an item with the item that was purchased. Other types of relationships may include an indication of items that are determined to be substitutes for one another, items that are identical but offered in different regions or using different interfaces, search queries that are identical but were used in different regions to search different item databases, and so forth.

The subgraph data 118 may be determined by determining a particular node of the graph data 104 that represents the entity associated with the entity identifier 112, then determining a subset of the nodes and edges of the graph data 104 that are associated with the node that represents the entity. In some implementations, the subgraph module 116 may access threshold data 120, which may include one or more rules, algorithms, equations, threshold values, and so forth that may be used to determine the subgraph data 118 based on the graph data 104 and entity data 110. For example, the threshold data 120 may indicate a threshold distance, relative to the node that represents the entity, that is to be used to determine the subgraph data 118. Continuing the example, if a threshold value indicates a distance of one, the subgraph data 118 may include the node that represents the entity and each node that is connected to the node that represents the entity by an edge. If a threshold value indicates a distance of two, the subgraph data 118 may also include each node connected by an edge to a node that is connected to the node that represents the entity. In other implementations, the subgraph module 116 may determine the subgraph data 118 based on one or more graph retrieval algorithms. For example, the threshold data 120 may include types of edges or other characteristics used to filter nodes and edges of the graph data 104 to determine the subgraph data 118. As another example, the threshold data 120 may include one or more rules associated with business logic for an entity, and the subgraph data 118 may be determined based on entities and relationships between entities determined based on the business logic or associated rules. In still other implementations, the subgraph module 116 may include one or more machine learning algorithms, and the subgraph data 118 may be determined based on one or more attention-based techniques or other types of trained models or algorithms.

A graph encoder 122 associated with the representation server(s) 114 may determine a graph representation 124 based on the subgraph data 118. In some implementations, the graph representation 124 may include a vector embedding having dimensions that represent characteristics of subgraphs, and values for each dimension that represent the particular characteristics of the subgraph data 118. Because the subgraph data 118 includes not only the node that represents the entity, but also one or more edges indicative of the type of relationship between the entity and other entities, and the nodes that represent one or more other entities, the graph representation 124 may represent the characteristics of the entity, as well as at least a portion of the types of relationships represented by the edges that are connected to the node that represents the entity, and at least a portion of the characteristics of the other nodes associated with those edges.

In some implementations, the graph encoder 122 may be trained to determine graph representations 124 using training data that includes multiple nodes indicative of entity characteristics, and edges indicative of types of relationships between entities. As described previously, one type of relationship represented by an edge may include co-occurrence of user interactions associated with two nodes. The graph encoder 122 may be trained to predict occurrence of a first type of relationship using the training data and one or more loss functions. Other types of relationships may be used in message-passing between layers of the graph encoder 122 and may be represented in the graph representation 124.

A text encoder 126 associated with the representation server(s) 114 may determine a text representation 128 based on the text data 106. In some implementations, the text representation 128 may include a vector embedding having dimensions that represent characteristics of the text data 106, such as the inclusion of words, groups of words, sub-words, groups of sub-words, characters, groups of characters, and so forth. The text representation 128 may also represent semantic information associated with the text data 106, such as the order or arrangement of words or characters, proximity of words to other words, use of capitalization and punctuation, and so forth.

An image encoder 130 associated with the representation server(s) 114 may determine an image representation 132 based on the image data 108. In some implementations, the image representation 132 may include a vector embedding having dimensions that represent characteristics of the image data 108, such as the locations and colors of pixels and so forth.

While FIG. 1 describes use of a graph encoder 122, text encoder 126, and image encoder 130, and the generation of vector embeddings as example types of representations, any type of machine learning model, network, algorithm, and so forth may be used to generate any type of representations associated with the subgraph data 118, text data 106, and image data 108. Additionally, in some implementations, one or more of the text data 106 or image data 108 may be absent or excluded from processing, and representations of only the subgraph data 118 or of only the subgraph data 118 and one of the image data 108 or text data 106 may be used. In some implementations, other types of data in addition to or in place of subgraph data 118, text data 106, or image data 108 may be associated with an entity. In such cases, encoders or other types of machine learning models may be used to determine representations based on the other type(s) of data.

An input module 134 associated with the representation server(s) 114 may determine input data 136 based on the graph representation 124, the text representation 128, and the image representation 132. In some implementations, the input module 134 may access input parameters 138, which may include one or more rules, algorithms, threshold values, dimensionalities, processing steps, tokens, or other parameters that may be used to determine the input data 136. For example, generation of the input data 136 may include use of one or more projection operations to modify one or more of the graph representation 124, text representation 128, or image representation 132 to correspond to the dimensions of an embedding space used by a large language model (LLM). In some cases, generation of the input data 136 may include the addition of one or more tokens, such as separator tokens, initial tokens, tokens indicating the end of an input, and so forth. In some implementations, multiple graph representations 124, text representations 128, or image representations 132 may be determined, and generation of the input data 136 may include performing a pooling or averaging process to determine a final graph representation 124, text representation 128, or image representation 132 for use generating input data 136.

The LLM 140 may determine an entity representation 102, that represents the characteristics of the entity indicated in the entity data 110, based on the input data 136. Because the input data 136 was determined based on the subgraph data 118, text data 106, and image data 108, the entity representation 102 may represent not only the characteristics of the entity indicated in the text data 106 and image data 108, but also characteristics of the entity indicated in the subgraph data 118, characteristics of relationships between the entity and other entities, and characteristics of related entities.

In some implementations, the LLM 140 may be trained to determine entity representations 102 based on one or more of graph data 104, text data 106, or image data 108, using training data that includes multiple pairs of values, such as seed values and target values. For example, the LLM 140 may be trained to predict subsequent seed tokens, subsequent target tokens, target tokens that correspond to seed tokens, and contrastive loss associated with seed and target tokens. Continuing the example, the LLM 140 may be trained using training data that includes pairs of values, a first loss function based on prediction of a first value of a pair based on a second value of the pair, and a second loss function based on contrastive loss associated with the first value and the second value of the pair. While FIG. 1 depicts generation of entity representations 102 using an LLM 140, in other implementations, other types of machine learning models may be used. In some implementations an entity representation 102 may be determined based on one or more outputs associated with the LLM 140, such as by performing an averaging or pooling operation based on multiple outputs, by projecting or otherwise modifying or formatting the output(s) to a selected dimensionality or format, and so forth.

Entity representations 102 for multiple entities may be generated and stored in a data repository 142. While FIG. 1 depicts a data repository 142 as a separate element from the representation server(s) 114 for illustrative purposes, in some implementations, the representation server(s) 114 may store the entity representations 102. The entity representations may be used by one or more downstream devices 144 for a variety of purposes.

For example, based on a distance or other metric for determining similarities between entities represented by entity representations 102, a downstream device 144 may determine one or more outputs 146 indicative of recommendations of items, recommendations of search queries or query terms, prediction of characteristics of items, and so forth.

FIG. 2 is a flow diagram 200 depicting an implementation of a method for determining entity representations 102 for an entity based on graph data 104, text data 106, and image data 108, and using entity representations 102 to determine an output 146. At 202, a first machine learning model may be trained to determine graph representations 124 using training data indicative of entity characteristics and relationships between entities. For example, the first machine learning model may include a graph encoder 122 or another type of machine learning model that may generate graph representations 124 based at least in part on subgraph data 118. The first machine learning model may be trained to predict a first type of relationship between entities, such as co-occurring user interactions, while other types of relationships may affect the determined graph representations 124. For example, a graph encoder 122 may include many convolutional layers, and based on a loss function, may be trained to predict a first type of relationship while other types of relationships are used in message-passing between layers.

At 204, entity data 110 indicative of an entity may be determined. The entity data 110 may be determined based on user input, input from a service, machine learning model, or computing device, or automatically. For example, a representation server 114 or other computing device may be configured to automatically generate entity representations 102 based on stored or accessible entity data 110. Entity data 110 associated with an entity may include an entity identifier 112 indicative of the entity and in some implementations may include one or more of text data 106 or image data 108. As described previously, in some implementations, types of entities may include items associated with an online store, search queries, item categories, or item brands or manufacturers.

At 206, subgraph data 118 may be determined based on correspondence between the entity data 110 and graph data 104 that is indicative of entity characteristics and relationships between entities. For example, in one implementation, the graph data 104 may include nodes that represent entities and may include information associated with entities, and edges that represent relationships between entities, each edge being associated with two nodes. One type of relationship represented by an edge may include co-occurrence of user interactions for two items represented by the associated nodes. Other example types of relationships represented by edges may include an indication of an association between an item and the item category to which the item belongs, or an indication of an association between an item and the brand or manufacturer of that item. Another example type of association may include a relationship between a search query that resulted in a purchase or other type of user interaction associated with an item. Other types of relationships may include an indication of items that are determined to be substitutes for one another, items that are identical or similar and offered in different regions or using different interfaces, search queries that are identical or similar and used in different regions to search different item databases, and so forth. As described with regard to FIG. 1, in some implementations, the subgraph data 118 may be determined based in part on threshold data 120, which may indicate a threshold distance value associated with a node that represents an entity. For example, based on a threshold distance value of one, subgraph data 118 that includes a node that represents the entity and each node connected to that node by an edge may be determined. Based on a threshold distance value of two, subgraph data 118 that also includes each node connected by an edge to a node that is connected to the node that represents the entity may be determined.

At 208, graph representation data may be determined based on the subgraph data 118 and the first machine learning model. For example, in one implementation, the graph representation 124 may include a vector embedding having dimensions that represent characteristics of the subgraph data 118, with the values for each dimension representing the particular characteristics of the subgraph data 118. Because the subgraph data 118 includes the node that represents the entity, one or more edges indicative of relationships between the entity and other entities, and the nodes that represent one or more other entities, the graph representation 124 may represent the characteristics of the entity, the relationships, and at least a portion of the characteristics of the other entities.

At 210, text data 106 and image data 108 associated with the entity may be determined. In some implementations, the text data 106 and image data 108 may be included in the entity data 110. In other implementations, the text data 106 and image data 108 that correspond to the entity indicated in the entity data 110 may be determined by accessing other data sources. In some cases, one or more of the text data 106 or image data 108 may be absent or excluded from use.

At 212, text representation data may be determined based on the text data 106 and a second machine learning model. For example, a text encoder 126 or other type of machine learning model may be trained to determine representations of the words, subwords (e.g., portions of words), characters, and semantic information associated with text. The text representation data may therefore represent characteristics of the text data 106, such as the words included in the text data 106, and semantic information such as the arrangement of the words, the proximity of the words relative to other words, and so forth.

At 214, image representation data may be determined based on the image data 108 and a third machine learning model. For example, the third machine learning model may include an image encoder 130 or another type of machine learning model. In some implementations, the image representation 132 may include a vector embedding having dimensions that represent characteristics of the image data 108, such as the locations and colors of pixels.

At 216, input data 136 may be determined based on the graph representation data, the text representation data, and the image representation data. In some implementations, the input data 136 may be determined by concatenating the graph representation data, text representation data, and image representation data, in some implementations with one or more initial tokens, separator tokens, or concluding tokens. Additionally, in some implementations, one or more of the graph representation data, text representation data, or image representation data may be modified, such as through use of a projection technique, to map the representation to a dimensionality that is usable with the LLM 140. Additionally, in some implementations, multiple graph, image, or text representations may be determined, and generation of the input data 136 may include use of an averaging or pooling technique to determine individual graph, image, or text representations for use in determining the input data 136.

At 218, the fourth machine learning model may be trained to determine entity representations 102 using training data that includes pairs of values, a first loss function based on prediction of a first paired value based on a second paired value, and a second loss function based on contrastive loss associated with the first and second values. For example, in some implementations the machine learning model may include a large language model (LLM) 140 that is provided with training data that includes paired seed and target values. The LLM 140 may be trained to predict subsequent seed tokens, subsequent target tokens, target tokens that correspond to seed tokens, and contrastive loss associated with seed and target tokens.

At 220 an entity representation 102 may be determined based on the input data 136 and the fourth machine learning model. In some implementations, the output from the fourth machine learning model may include the entity representation 102. In other implementations, the fourth machine learning model may determine multiple representations, and a final entity representation 102 may be determined using a pooling or averaging operation, or one or more other rules, algorithms, or thresholding operations. In some implementations, an output from the fourth machine learning model may be modified to determine the entity representation 102, such as through the addition or removal of data, use of a projection operation to modify the dimensionality of the output, and so forth.

At 222, one or more outputs 146 may be determined based on a relationship between the entity representation 102 and a second entity representation 102 associated with a second entity. For example, the process described with regard to FIG. 2 may be performed for multiple entities, such that each entity is associated with an entity representation 102 that represents the characteristics of that entity. Various operations, such as distance-determination operations within a common embedding space, may be used to determine similarities and differences between entities based on the entity representations 102. As described with regard to FIG. 1, entity representations 102 may be stored and accessed by downstream devices 144, which may determine outputs 146 based on the entity representations 102. For example, similarities between entity representations 102 may be used to determine identical, similar, related, or subsequent items, which may be used to determine outputs 146 that include item recommendations. As another example, similarities between entity representations 102 may be used to recommend search queries or search query terms. Similarities and differences between entity representations 102 may be used to predict characteristics of entities, classify or categorize entities, and so forth. Additionally, generation of entity representations 102 for a set of entities that may be used by a large number of downstream devices 144 may conserve time and computational resources by enabling each downstream device 144 to be configured to utilize the same types of entity representations 102, while the process performed using the representation server(s) 114 may be performed a single time, rather than by each downstream device 144.

Figure 3B:
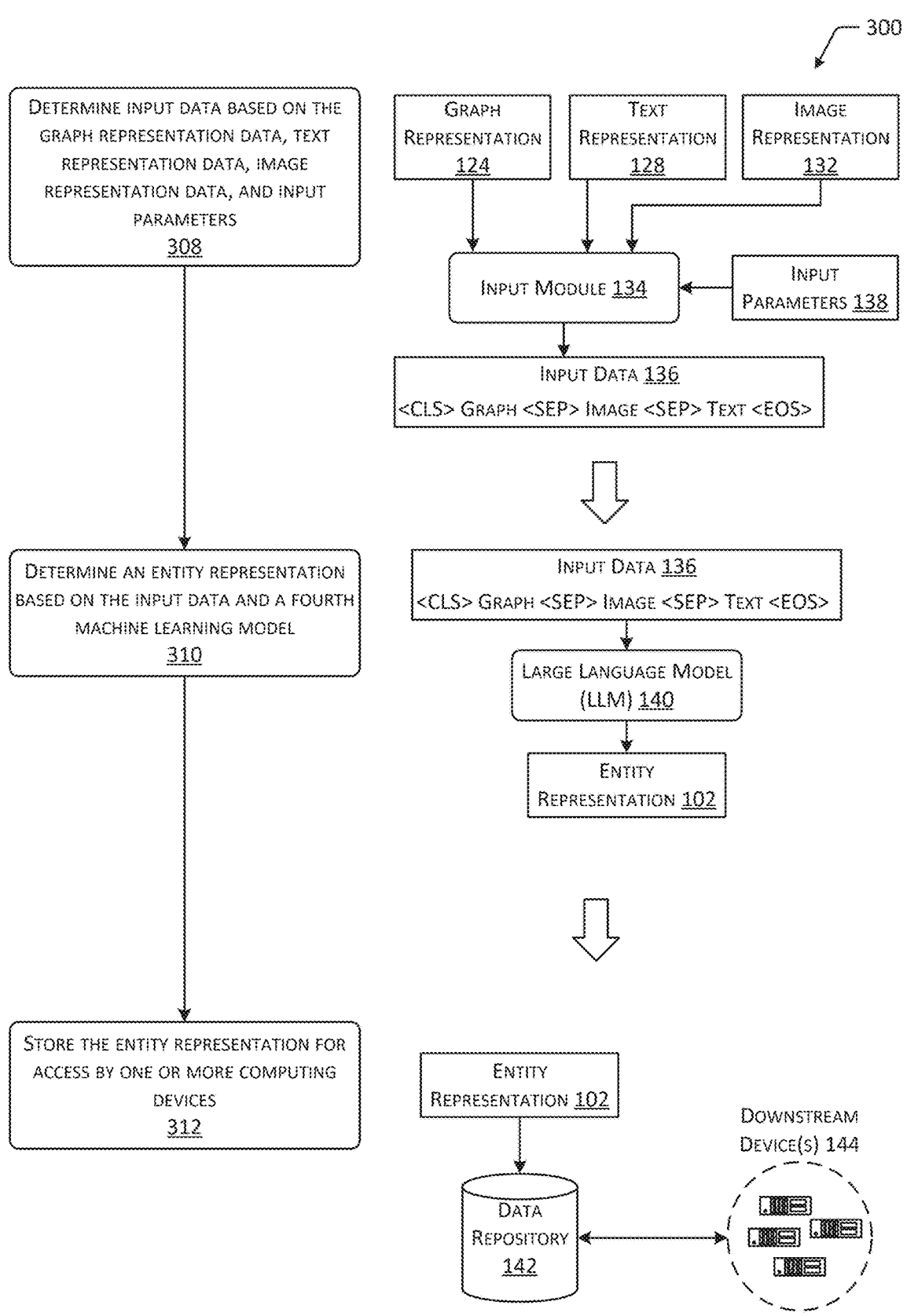

FIGS. 3A and 3B are a diagram 300 depicting an implementation of a method for determining entity representations 102 based on graph data 104, text data 106, image data 108, and one or more machine learning models. As shown in FIG. 3A, at 302, entity data 110 may be determined. The entity data 110 may include text data 106 and image data 108 associated with an entity. For example, entity data 110 indicative of a particular entity may be received or indicated via user input, automated input associated with one or more services or computing devices, and so forth. The entity data 110 may include an entity identifier 112 indicative of a particular entity, and in some implementations may also include text data 106 and image data 108. In other implementations, one or more of the text data 106 or the image data 108 may be determined from one or more other sources in response to determination of the entity data 110, receipt of input indicative of an entity, and so forth. In still other implementations, one or more of the text data 106 or image data 108 may be omitted.

At 304, subgraph data 118 may be determined based on the entity data 110, graph data 104 indicative of entity characteristics and relationships between entities, and a threshold distance value. For example, graph data 104 may include multiple nodes, each node representing an entity and characteristics of the represented entity. The graph data 104 may also include multiple edges, each edge associated with two nodes and representing a relationship between the entities represented by the nodes. Threshold data 120 may indicate one or more threshold distance values that represent a distance from a node that represents the entity indicated in the entity data 110. Subgraph data 118 may be determined based on a set of nodes and edges that are within the threshold distance of the node that represents the entity indicated in the entity data 110.

At 306, graph representation data may be determined based on the subgraph data 118 and a first machine learning model, text representation data may be determined based on the text data 106 and a second machine learning model, and image representation data may be determined based on the image data 108 and a third machine learning model. For example, the machine learning models described with regard to 306 may include encoders that generate representation data based on input data having a particular modality. Continuing the example, as described with regard to FIG. 1, a graph encoder 122 may be used to determine a graph representation 124 based on the subgraph data 118. Because the graph representation 124 is determined based on the subgraph data 118, the graph representation 124 may represent characteristics of not only the indicated entity, but also characteristics of the relationships between that entity and other entities, and characteristics of the related entities. A text encoder 126 may be used to determine a text representation 128 based on the text data 106. The text representation 128 may represent the words and semantic information included in the text data 106. An image encoder 130 may be used to determine an image representation 132 based on the image data 108. The image representation 132 may represent characteristics of the image(s) included in the image data 108.

As shown in FIG. 3B, at 308, input data 136 may be determined based on the graph representation data, text representation data, image representation data, and input parameters 138. The input parameters 138 may include one or more rules, algorithms, threshold values, dimensionalities, processing steps, tokens, or other parameters that may be used to determine the input data 136. For example, generation of the input data 136 may include use of one or more projection operations to modify one or more of the graph representation 124, text representation 128, or image representation 132 to correspond to the dimensions of an embedding space used by a subsequent machine learning model, such as a large language model (LLM) 140. In some implementations, generation of the input data 136 may include the addition of one or more tokens, such as separator tokens, initial tokens, tokens indicating the end of an input, and so forth. In some implementations, multiple graph representations 124, text representations 128, or image representations 132 may be determined, and generation of the input data 136 may include performing a pooling or averaging process to determine a final graph representation 124, text representation 128, or image representation 132 for use generating input data 136.

At 310, an entity representation 102 may be determined based on the input data 136 and a fourth machine learning model. As described with regard to FIGS. 1 and 2, in some implementations, the fourth machine learning model may include an LLM 140. The entity representation 102 may represent the characteristics of the entity indicated in the subgraph data 118, text data 106, and image data 108, which due to the inclusion of information from the subgraph data 118 in the input data 136 may represent not only the characteristics of the indicated entity, but also of relationships between the entity and other entities, and characteristics of related entities. In some implementations an entity representation 102 may be determined based on one or more outputs associated with the LLM 140, such as by performing an averaging or pooling operation based on multiple outputs, by projecting or otherwise modifying or formatting the output(s) to a selected dimensionality or format, and so forth.

At 312, the entity representation 102 may be stored for access by one or more computing devices. For example, entity representations 102 for multiple entities may be generated and stored in a data repository 142. One or more downstream devices 144 may access the data repository 142 to perform various operations, such as recommendations of similar or related items, brands, categories, or search queries, prediction of characteristics of items, and so forth.

FIG. 4 is a block diagram 400 depicting an implementation of a computing device 402 within the present disclosure. The computing device 402 may include one or more representation servers 114, as described with regard to FIG. 1. In other implementations, one or more downstream devices 144, or other computing devices in communication with the computing device 402, may perform one or more of the functions described herein. Therefore, while FIG. 4 depicts a single block diagram 400 representative of a computing device 402, any number of computing devices 402 may be used, of similar or differing types. For example, a first computing device or set of computing devices may be used to train one or more of the subgraph module 116, graph encoder 122, text encoder 126, image encoder 130, or LLM 140, while a second computing device or set of computing devices may store and execute the LLM 140 and in some cases one or more of the subgraph module 116, graph encoder 122, text encoder 126, or image encoder 130. As another example, a first computing device or set of computing devices may determine entity representations 102, while a second computing device or set of computing devices may include one or more data repositories 142 for storing entity representations 102. In some cases, a data repository 142 may include a cache or other type(s) of memory that may enable entity representations 102 to be accessed efficiently for one or more uses by downstream devices 144.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, keyboards, mouse devices, microphones, image sensors, cameras, scanners, displays, speakers, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may store the subgraph module 116. The subgraph module 116 may determine subgraph data 118 based on entity data 110, graph data 104, and threshold data 120. The graph data 104 may represent characteristics of entities and relationships between entities. The entity data 110 may indicate a particular entity. The threshold data 120 may indicate one or more rules, algorithms, equations, threshold values, and so forth that may be used to determine the subgraph data 118 based on the graph data 104 and entity data 110, such as a threshold distance value from a node that represents the entity indicated in the entity data 110. For example, the subgraph data 118 may be determined by determining a particular node of the graph data 104 that represents the entity indicated in the entity data 110, then determining a subset of the nodes and edges of the graph data 104 that are associated with the node that represents the entity based on the threshold data 120. In some implementations, the subgraph module 116 may utilize one or more graph retrieval algorithms. For example, the threshold data 120 may indicate one or more characteristics of nodes or edges that may be used to filter the graph data 104 to determine the subgraph data 118. As another example, the threshold data 120 may include one or more rules associated with business logic for an entity, and the subgraph data 118 may be determined based on entities and relationships between entities represented in the graph data 104 and indicated in the business logic or associated rules. In other implementations, the subgraph module 116 may include one or more machine learning algorithms, and the subgraph data 118 may be determined based on one or more attention-based techniques or other types of models or algorithms.

The memory 418 may also store the graph encoder 122. The graph encoder 122 may determine graph representations 124 based on subgraph data 118. In some implementations, a graph representation 124 may include a vector embedding having dimensions and values that represent characteristics of the represented subgraph data 118. Because the subgraph data 118 includes the node that represents the entity, one or more edges indicative of relationships between the entity and other entities, and one or more nodes that represent related entities, the graph representation 124 may represent the characteristics of the entity, as well as at least a portion of the relationships represented by the edges and the characteristics of the related entities. In some implementations, the graph encoder 122 may be trained to determine graph representations 124 using training data that includes multiple nodes indicative of entity characteristics, and edges indicative of relationships between entities. For example, one type of relationship represented by an edge may include co-occurrence of user interactions associated with items represented by two nodes. The graph encoder 122 may be trained to predict occurrence of a first type of relationship using the training data and one or more loss functions. Other types of relationships may be used in message-passing between layers of the graph encoder 122 and may be represented in the graph representation 124.

The memory 418 may additionally store the text encoder 126. The text encoder 126 may determine text representations 128 based on text data 106 associated with an entity. In some implementations, the text representation 128 may include a vector embedding having dimensions that represent characteristics of the text data 106, such as the inclusion of words, groups of words, sub-words, groups of sub-words, characters, groups of characters, and so forth. The text representation 128 may also represent semantic information associated with the text data 106, such as the order or arrangement of words or characters, proximity of words to other words, use of capitalization and punctuation, and so forth.

The memory 418 may store the image encoder 130. The image encoder 130 may determine image representations 132 based on image data 108 associated with an entity. For example, image data 108 may include one or more images depicting an item, portions of an item, various views of the item, and so forth. In some cases, image data 108 may include a logo associated with a brand or manufacturer, a symbol or image associated with a category of items, and so forth. In some implementations, the image representation 132 may include a vector embedding having dimensions that represent characteristics of the image data 108, such as the locations and colors of pixels and so forth.

The memory 418 may also store the input module 134. The input module 134 may determine input data 136 based on one or more graph representations 124, text representations 128, and images representation 132. In some implementations, the input module 134 may access input parameters 138, which may include one or more rules, algorithms, threshold values, dimensionalities, processing steps, tokens, or other parameters that may be used to determine the input data 136. For example, in some cases, one or more projection operations may be used to modify the dimensionality of one or more of a graph representation 124, text representation 128, or image representation 132 to correspond to an embedding space used by an LLM 140 or other type of machine learning model. In some cases, multiple graph representations 124, text representations 128, or image representations 132 may be determined, and generation of the input data 136 may include performing a pooling or averaging process to determine a final graph representation 124, text representation 128, or image representation 132 for use generating input data 136. In some cases, generation of the input data 136 may include concatenation of a graph representation 124, text representation 128, and image representation 132, the addition of one or more tokens, such as initial tokens, separator tokens, and concluding tokens, and so forth.

The memory 418 may additionally store the large language model (LLM) 140 or one or more other types of machine learning models. The LLM 140 may be trained to determine entity representations 102 based on input data 136. Because the input data 136 was determined based on subgraph data 118, text data 106, and image data 108, the entity representation 102 may represent the characteristics of the entity indicated in the text data 106 and image data 108, as well as relationships between the entity and other entities, and characteristics of related entities, indicated in the subgraph data 118. In some implementations, the LLM 140 may be trained using training data that includes multiple pairs of values, such as seed values and target values. For example, the LLM 140 may be trained to predict subsequent seed tokens, subsequent target tokens, target tokens that correspond to seed tokens, and contrastive loss associated with seed and target tokens.

Other modules 426 may also be present in the memory 418. For example, encryption modules may be used to encrypt and decrypt communications between computing devices 402. Authentication modules may be used to authenticate communications sent or received by computing devices 402. Other modules 426 may also include modules for receiving user input, generating user interfaces such as interfaces that present output, or for modifying graph data 104, threshold data 120, input parameters 138, and so forth. Other modules 426 may include modules for training and tuning encoders and machine learning models, modifying parameters associated with encoders and machine learning models, and so forth.

Other data 428 within the data store(s) 422 may include configurations, settings, preferences, and default values associated with computing devices 402. Other data 428 may also include encryption keys and schema, access credentials, and so forth. Other data 428 may include corpus text for use with the LLM 140. Other data 428 may further include user interface data for receiving queries and other input and for presenting output. Other data 428 may also include training data for training of the encoders and machine learning models, loss functions associated with the encoders and machine learning models, and so forth.

In different implementations, different computing devices 402 may have different capabilities or capacities. For example, representation servers 114 that store and execute components of the system may have greater processing capabilities or data storage capacity than downstream devices 144.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EE-PROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
determine entity data indicative of first text and a first image associated with a first entity;
determine correspondence between the entity data and graph data, wherein the graph data includes:
a plurality of nodes comprising at least a first node and a second node, wherein the first node represents first characteristics of the first entity and the second node represents second characteristics of a second entity; and
a plurality of edges comprising at least a first edge associated with the first node and the second node that represents a type of a relationship between the first entity and the second entity;
determine subgraph data that includes a portion of the graph data that is associated with the first entity, wherein the subgraph data includes at least the first node, the second node, and the first edge;
determine graph representation data based on the subgraph data and a graph encoder, wherein the graph representation data is indicative of the first characteristics, the type of relationship, and the second characteristics;
determine image representation data based on the first image and an image encoder, wherein the image representation data is indicative of third characteristics of the first image;
determine text representation data based on the first text and a text encoder, where in the text representation data is indicative of fourth characteristics of the first text;
determine input data based on the graph representation data, the image representation data, the text representation data, and input parameters associated with inputs to a large language model (LLM), wherein the input parameters define a threshold distance between the first entity and the second entity, and the graph representation data corresponds to the input parameters;
send the input data to the large language model (LLM) that is trained to determine representations based on inputs representing graph data, image data, and text data;
receive an output from the LLM; and
determine, based on the output from the LLM, an entity representation, wherein the entity representation is indicative of:
the first characteristics of the first entity indicated in the graph data,
the second characteristics of the second entity indicated in the graph data,
the third characteristics of the first image associated with the first entity, and
the fourth characteristics of the first text associated with the first entity.

2. The system of claim 1, further comprising computer-executable instructions to:

train the graph encoder to determine the graph representation data using training data comprising a plurality of nodes indicative of entity characteristics and a plurality of edges indicative of types of relationships between entities, wherein:

a first type of relationship between entities includes occurrence of a first user interaction associated with a third entity and a first session, and a second user interaction associated with a fourth entity and the first session;

the graph encoder is trained to predict occurrence of the first type of relationship; and one or more second types of relationships that differ from the first type of relationship are represented in the graph representation data.

3. The system of claim 1, further comprising computer-executable instructions to:

train the large language model (LLM) to determine outputs based on inputs representing one or more of graph data, image data, or text data using training data that includes a plurality of pairs of values, a first loss function based on prediction of a first value of a pair of values based on a second value of the pair of values, and a second loss function based on contrastive loss associated with the first value and the second value.

4. A system comprising:

one or more memories storing computer-executable instructions; and one or more hardware processors to execute the computer-executable instructions to:

determine first entity data associated with a first entity, wherein the first entity data includes text data and image data associated with the first entity;

determine correspondence between the first entity data and graph data, wherein the graph data includes:

a plurality of nodes comprising at least a first node and a second node, wherein the first node represents first characteristics of the first entity and the second node represents second characteristics of a second entity; and a plurality of edges comprising at least a first edge associated with the first node and the second node that represents a relationship between the first entity and the second entity;

determine first graph representation data based on at least a first portion of the graph data using a first machine learning model, wherein the first graph representation data is indicative of the first characteristics, the relationship, and the second characteristics;

determine first input data based on the first graph representation data, the text data, the image data, and one or more input parameters associated with inputs to a second machine learning model, wherein the one or more input parameters define a threshold distance between the first entity and the second entity, and the first graph representation data corresponds to one or more the input parameters;

send the first input data to the second machine learning model that is trained to determine representations based on inputs representing graph data, image data, and text data;

receive a first output from the second machine learning model; and determine, based on the first output from the second machine learning model, a first entity representation indicative of at least a portion of the first characteristics of the first entity indicated in the graph data, the second characteristics of the second entity indicated in the graph data, the text data, and the image data.

5. The system of claim 4, further comprising computer-executable instructions to:

determine subgraph data based on the correspondence between the first entity data and the graph data and a threshold distance value indicative of a distance from the first node that represents the first entity, wherein the subgraph data comprises a first portion of the plurality of nodes and a second portion of the plurality of edges;

wherein the first graph representation data is further determined based on the subgraph data.

6. The system of claim 4, further comprising computer-executable instructions to:

determine text representation data based on at least a portion of the text data using a third machine learning model, wherein the text representation data is indicative of at least a portion of the text data and semantic information associated with the text data; and wherein the first input data is further determined based in part on the text representation data.

7. The system of claim 4, further comprising computer-executable instructions to:

determine image representation data based on at least a portion of the image data using a third machine learning model, wherein the image representation data is indicative of one or more characteristics of the image data; and wherein the first input data is further determined based in part on the image representation data.

8. The system of claim 4, further comprising computer-executable instructions to:

determine text representation data based on at least a portion of the text data using a third machine learning model, wherein the text representation data is indicative of at least a portion of the text data and semantic information associated with the text data; and determine image representation data based on at least a portion of the image data using a fourth machine learning model, wherein the image representation data is indicative of one or more characteristics of the image data;

wherein the first input data is further determined based in part on the text representation data and the image representation data.

9. The system of claim 4, further comprising computer-executable instructions to:

train the first machine learning model to determine the first graph representation data using training data comprising a plurality of nodes indicative of characteristics of entities and a plurality of edges indicative of types of relationships between entities, wherein:

a first type of relationship between entities includes occurrence of a first user interaction associated with a third entity and a second user interaction associated with a fourth entity; and the first machine learning model is trained to predict occurrence of the first type of relationship.

10. The system of claim 4, further comprising computer-executable instructions to:

train the second machine learning model to determine outputs based on inputs representing one or more of graph data, image data, or text data using training data that includes a plurality of pairs of values, a first loss function based on prediction of a first value of a pair of values based on a second value of the pair of values, and a second loss function based on contrastive loss associated with the first value and the second value.

11. The system of claim 4, wherein the first entity includes one of:

an item having one or more first item characteristics;

a search query including one or more second item characteristics;

a brand associated with one or more first items and one or more brand characteristics, wherein each first item of the one or more first items is associated with a respective one or more third item characteristics;

an item category associated with one or more second items and one or more category characteristics, wherein each second item of the one or more second items is associated with a respective one or more fourth item characteristics; or a geographic region associated with one or more third items and one or more region characteristics, wherein each third item of the one or more third items is associated with a respective one or more fifth item characteristics.

12. The system of claim 4, further comprising computer-executable instructions to:

determine second entity data associated with a third entity;

determine correspondence between the second entity data and the graph data;

determine second graph representation data based on at least a second portion of the graph data using the first machine learning model;

determine second input data based at least in part on the second graph representation data;

provide the second input data to the second machine learning model;

determine, based on a second output from the second machine learning model, a second entity representation indicative of one or more third characteristics associated with the third entity;

determine output data associated with the first entity;

determine that the first entity representation corresponds to the second entity representation within a threshold similarity; and include in the output data an indication associated with the third entity.

13. A computer-implemented method comprising:

determining first entity data associated with a first entity, wherein the first entity data includes one or more of text data or image data associated with the first entity;

determining correspondence between the first entity data and graph data, wherein the graph data associates first characteristics of the first entity with second characteristics of a second entity and a type of relationship associated with the first entity and the second entity;

determining first graph representation data based on at least a first portion of the graph data and a first machine learning model, where in the first graph representation data is indicative of the first characteristics, the type of relationship, and the second characteristics;

determining first input data based at least in part on the first graph representation data, the one or more of the text data or the image data, and one or more input parameters associated with inputs to a second machine learning model, wherein the one or more input parameters define a threshold distance between the first entity and the second entity, and the first graph representation data corresponds to the one or more input parameters;

sending the first input data to the second machine learning model that is trained to determine representations based on inputs representing one or more of graph data, image data, or text data;

receiving a first output from the second machine learning model; and determining, based on the first output from the second machine learning model, a first entity representation indicative of at least a portion of the first characteristics of the first entity indicated in the graph data, the second characteristics of the second entity indicated in the graph data, and the one or more of the text data or the image data.

14. The method of claim 13, wherein the graph data includes:

a plurality of nodes comprising at least a first node and a second node, wherein the first node represents the first characteristics of the first entity and the second node represents the second characteristics of the second entity; and a plurality of edges comprising at least a first edge associated with the first node and the second node that represents the type of relationship between the first entity and the second entity.

15. The method of claim 14, further comprising:

determining subgraph data based on:

the correspondence between the first entity data and the graph data; and a threshold distance value indicative of a distance from the first node;

wherein the subgraph data comprises a first portion of the plurality of nodes and a second portion of the plurality of edges, and the first graph representation data is further determined based on the subgraph data.

16. The method of claim 13, wherein the first entity data includes the text data associated with the first entity, the method further comprising:

determining text representation data based on at least a portion of the text data using a third machine learning model, wherein the text representation data is indicative of at least a portion of the text data and semantic information associated with the text data; and wherein the first input data is further determined based in part on the text representation data.

17. The method of claim 13, wherein the first entity data includes the image data associated with the first entity, the method further comprising:

determining image representation data based on at least a portion of the image data using a third machine learning model, wherein the image representation data is indicative of one or more characteristics of the image data; and wherein the first input data is further determined based in part on the image representation data.

18. The method of claim 13, wherein the first entity data includes the text data and the image data associated with the first entity, the method further comprising:

determining text representation data based on at least a portion of the text data using a third machine learning model, wherein the text representation data is indicative of at least a portion of the text data and semantic information associated with the text data; and determining image representation data based on at least a portion of the image data using a fourth machine learning model, wherein the image representation data is indicative of one or more characteristics of the image data;

wherein the first input data is further determined based in part on the text representation data and the image representation data.

19. The method of claim 18, wherein the first machine learning model includes a graph encoder, the second machine learning model includes a large language model (LLM), the third machine learning model includes a text encoder, and the fourth machine learning model includes an image encoder.

20. The method of claim 13, further comprising:

training the first machine learning model to determine the first graph representation data using training data comprising a plurality of nodes indicative of characteristics of entities and a plurality of edges indicative of types of relationships between entities, wherein:

a first type of relationship between entities includes occurrence of a first user interaction associated with a third entity and a second user interaction associated with a fourth entity;

the first machine learning model is trained to predict occurrence of the first type of relationship; and one or more second types of relationships that differ from the first type of relationship are represented in the first graph representation data.

* * * * *